United States Patent
Ito et al.

(10) Patent No.: US 10,609,237 B2
(45) Date of Patent: Mar. 31, 2020

(54) IMAGE FORMING SYSTEM FOR PROCESSING SHEET INFORMATION, PRINTING APPARATUS AND METHOD FOR CONTROLLING THE SAME, AND COMPUTER-READABLE STORAGE MEDIUM

(71) Applicant: CANON KABUSHIKI KAISHA, Tokyo (JP)

(72) Inventors: Aya Ito, Tokyo (JP); Yuzo Harano, Sagamihara (JP); Hideaki Ooba, Yokohama (JP); Nobuhiro Kawamura, Nagareyama (JP); Yusuke Kimura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/257,632

(22) Filed: Jan. 25, 2019

(65) Prior Publication Data

US 2019/0238701 A1    Aug. 1, 2019

(30) Foreign Application Priority Data

Jan. 31, 2018 (JP) ................................. 2018-015725

(51) Int. Cl.
*H04N 1/00* (2006.01)

(52) U.S. Cl.
CPC ..... *H04N 1/00694* (2013.01); *H04N 1/00408* (2013.01); *H04N 1/00623* (2013.01);
(Continued)

(58) Field of Classification Search
CPC ........... B65H 2220/02; B65H 2220/01; B65H 2511/10; B65H 2511/20; B65H 2511/414;
(Continued)

(56) References Cited

U.S. PATENT DOCUMENTS

| 8,121,501 | B2 * | 2/2012 | Mashiba | G03G 15/0131 399/45 |
| 8,917,417 | B2 * | 12/2014 | Li | G06K 15/1843 358/1.13 |

(Continued)

FOREIGN PATENT DOCUMENTS

JP    2016144909 A    8/2016

*Primary Examiner* — Negussie Worku
(74) *Attorney, Agent, or Firm* — Canon U.S.A., Inc. IP Division

(57) ABSTRACT

An image forming system having a printing apparatus including a feeder to be pulled out and an image forming unit. The printing apparatus further includes a reception unit to receive a user instruction for setting sheet information on a sheet in association with the feeder. Based on set sheet information, the image forming unit forms an image on a sheet fed from the feeder. The image forming system further includes a display unit to display feeder information and a detection unit to detect that the feeder in a pulled-out state is closed. The display unit displays the feeder information subjected to the user instruction in a first display form and, based on a detection by the detection unit, changes the display by the display unit including the first display form having the feeder information to a display including a second display form different from the first display form.

18 Claims, 12 Drawing Sheets

(52) U.S. Cl.
CPC ..... *H04N 1/00689* (2013.01); *H04N 1/00724* (2013.01); *H04N 1/00726* (2013.01)

(58) Field of Classification Search
CPC ............ B65H 2220/03; B65H 2511/30; B65H 2511/415; B65H 2511/416; B65H 2511/51; B65H 2513/512; B65H 1/04; B65H 7/02; B65H 1/14; B65H 2405/32; B65H 2407/21; B65H 2557/12; B65H 2801/06; B65H 2801/27; B65H 37/04; B65H 37/06; B65H 3/0684; B65H 3/44; B65H 45/00; B65H 45/18; B65H 45/28; B65H 7/20; G06F 3/1204; G06F 3/1288; G06F 3/1205; G06F 3/1208; G06F 3/1229; G06F 3/1232; G06F 3/1253; G06F 3/1255; G06F 3/126; G06F 3/1265; G06F 3/1274; H04N 1/00037; H04N 1/0032; H04N 1/00551; H04N 1/00689; H04N 1/00694; H04N 1/00713; H04N 1/00734; H04N 1/00891; H04N 1/00896; H04N 1/00901; H04N 2201/0091; H04N 1/00; H04N 1/00466; H04N 1/233; H04N 1/2384; H04N 1/387; H04N 1/3872

USPC ......... 358/1.15, 1.13, 1.18, 1.12, 1.14, 1.16, 358/1.2, 1.6, 1.9, 498; 271/8.1, 9.09, 271/9.01, 9.05, 9.06; 399/23, 370, 376, 399/389, 391, 393, 397, 45, 72

See application file for complete search history.

(56) References Cited

U.S. PATENT DOCUMENTS

| | | | | |
|---|---|---|---|---|
| 8,994,971 | B2* | 3/2015 | Fukuda | B65H 3/44 |
| | | | | 271/9.05 |
| 9,467,586 | B2* | 10/2016 | Hata | H04N 1/00891 |
| 9,536,182 | B2* | 1/2017 | Ito | G06K 15/1809 |
| 9,815,646 | B2* | 11/2017 | Iwadate | G03G 15/6508 |
| 9,902,586 | B2* | 2/2018 | Iida | B65H 37/04 |
| 9,927,753 | B2* | 3/2018 | Takahashi | G03G 15/5062 |
| 2015/0294200 | A1* | 10/2015 | Ito | G06K 15/1809 |
| | | | | 358/1.15 |
| 2016/0313951 | A1* | 10/2016 | Ito | G06F 3/126 |
| 2018/0203645 | A1* | 7/2018 | Ito | G06F 3/1205 |
| 2019/0112140 | A1* | 4/2019 | Harano | B65H 7/04 |
| 2019/0114519 | A1* | 4/2019 | Kimura | G06K 15/4065 |
| 2019/0310805 | A1* | 10/2019 | Harano | G06F 3/1204 |

* cited by examiner

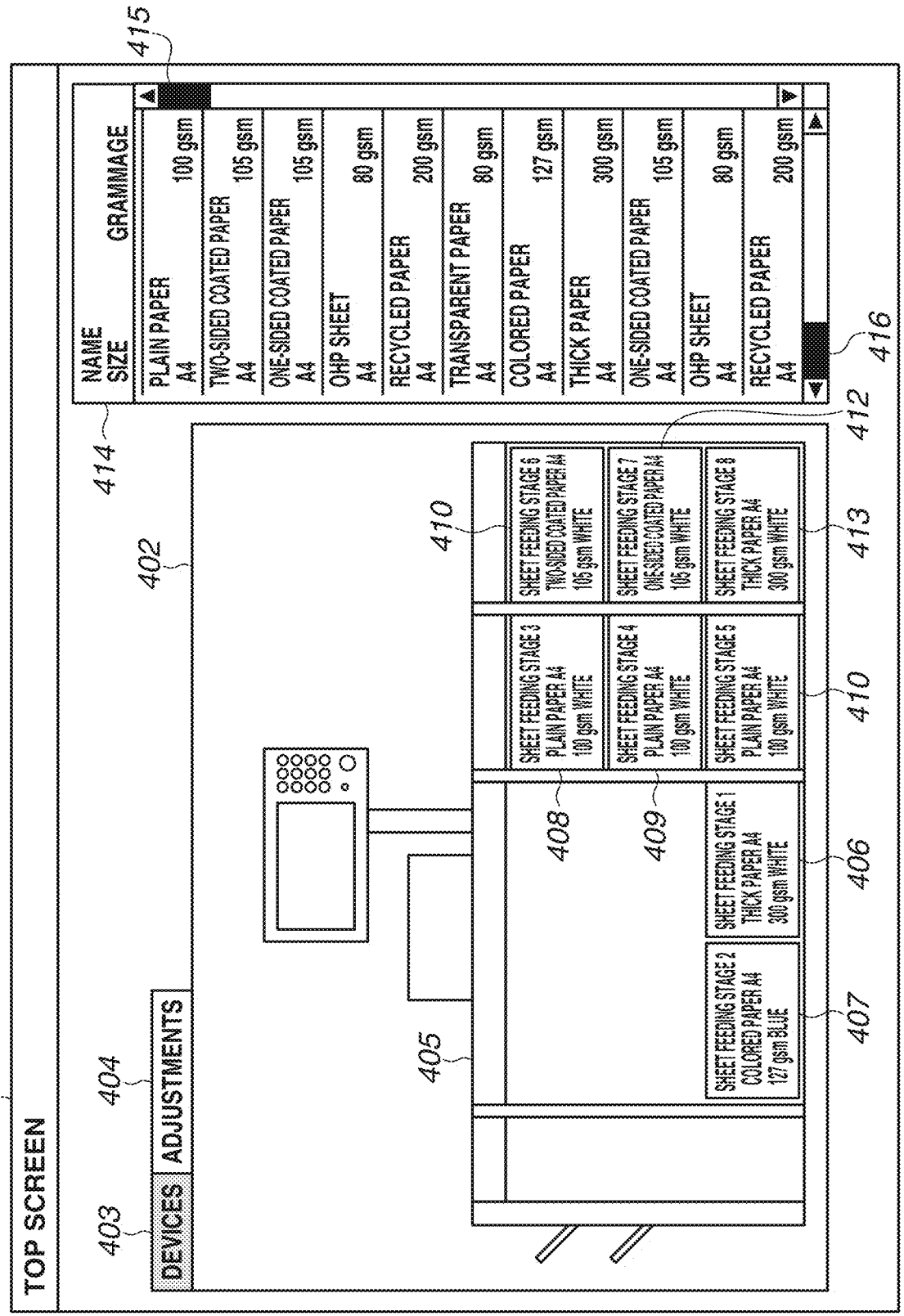

FIG.4B

TOP SCREEN — 401

403 — DEVICES | 404 — ADJUSTMENTS

- ADJUST IMAGE POSITION
- CORRECT CURL
- ADJUST SADDLE STITCH FOLD POSITION
- ADJUST CREEP CORRECTION AMOUNT
- ADJUST SADDLE STITCH BINDING FOLD POSITION
- CHANGE SADDLE STITCH BINDING POSITION
- ADJUST SECONDARY TRANSFER VOLTAGE
- ADJUST SECONDARY TRANSFER VOLTAGE OF LEADING EDGE
- ADJUST SECONDARY TRANSFER NEUTRALIZATION BIAS
- ADJUST PRIMARY TRANSFER VOLTAGE
- ADJUST GLOSSINESS/BLACK GRADE

402 / 417 / 418 / 414 — adjustment values:
- NOT ADJUSTED
- NOT ADJUSTED
- 0 mm
- 0 mm
- 0 mm
- NOT ADJUSTED
- NOT ADJUSTED
- NOT ADJUSTED
- NOT ADJUSTED 415 / 416 — Paper list:

| NAME / SIZE | GRAMMAGE |
|---|---|
| PLAIN PAPER / A4 | 100 gsm |
| TWO-SIDED COATED PAPER / A4 | 105 gsm |
| ONE-SIDED COATED PAPER / A4 | 105 gsm |
| OHP SHEET / A4 | 80 gsm |
| RECYCLED PAPER / A4 | 200 gsm |
| TRANSPARENT PAPER / A4 | 80 gsm |
| COLORED PAPER / A4 | 127 gsm |
| THICK PAPER / A4 | 300 gsm |
| ONE-SIDED COATED PAPER / A4 | 105 gsm |
| OHP SHEET / A4 | 80 gsm |
| RECYCLED PAPER / A4 | 200 gsm |

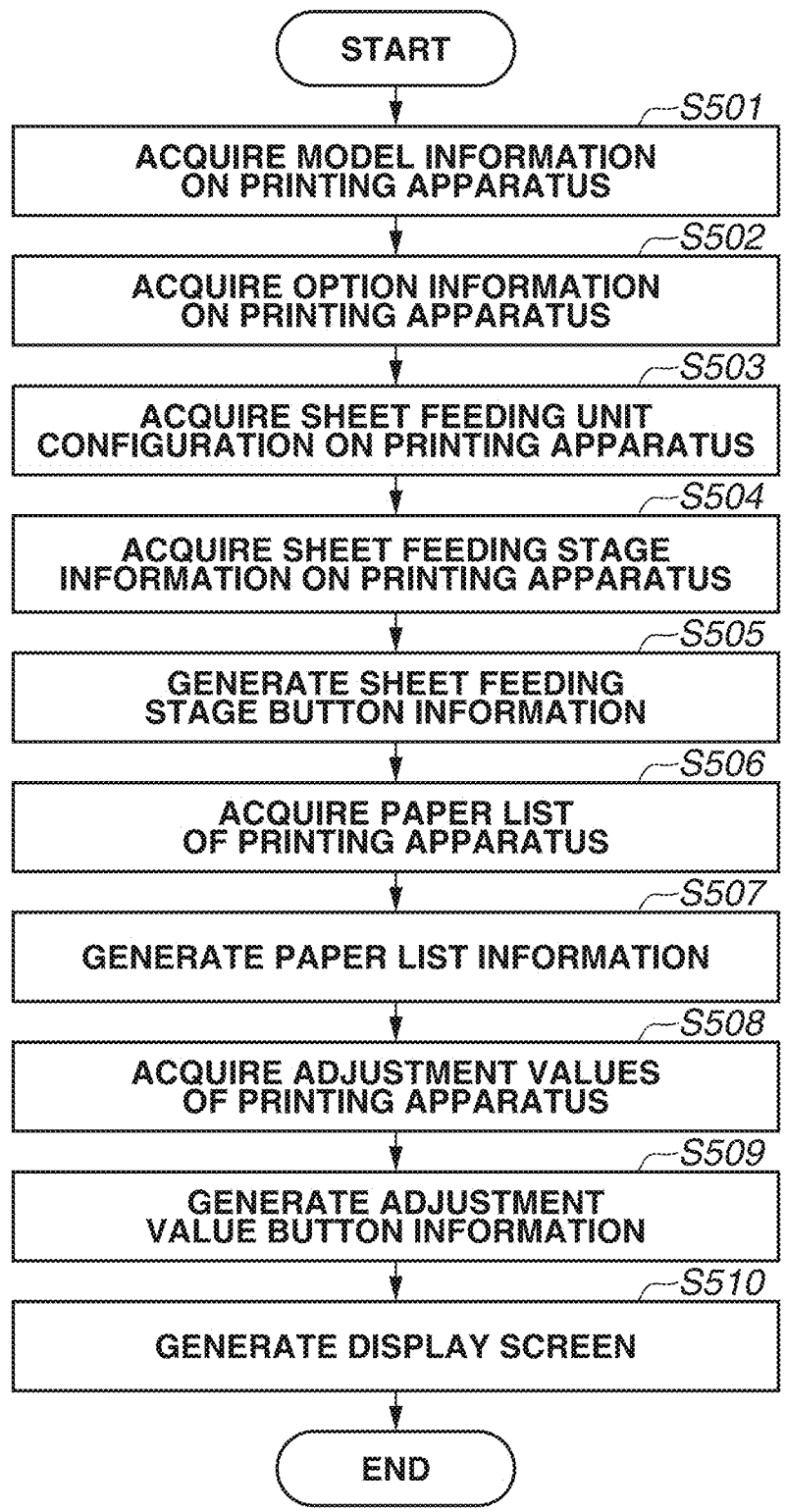

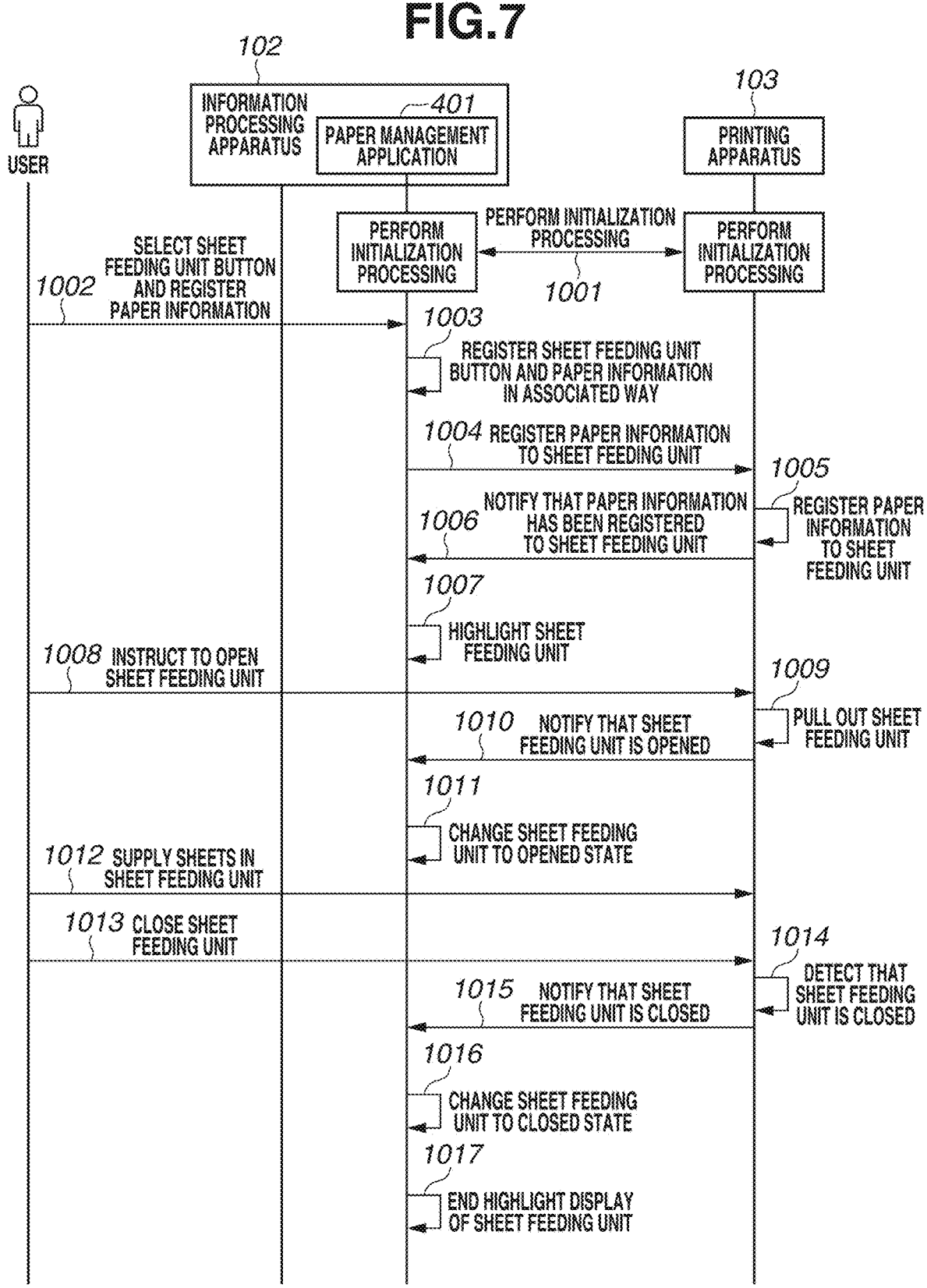

FIG.8

SHEET FEEDING STAGE 1

[ASSIGN] [UPDATE PAPER LIST] [CLOSE]

PAPER INFORMATION
- NAME: THICK PAPER
- GRAMMAGE: 300 g/m²
- SIZE: A4
- SURFACE NATURE: HIGH QUALITY PAPER
- FEATURE: NORMAL
- ADJUST IMAGE POSITION: NOT ADJUSTED
- CORRECT CURL: NOT ADJUSTED
- ADJUST SADDLE STITCH FOLD POSITION: 0 mm
- ADJUST CREEP CORRECTION AMOUNT: 0 mm
- ADJUST SADDLE STITCH BINDING FOLD POSITION: 0 mm
- COLOR: WHITE
- SECOND SURFACE OF TWO-SIDED SHEET: NOT PRINTED
- FIBER: UNSPECIFIED
- CHANGE SADDLE STITCH BINDING POSITION: 0 mm
- ADJUST SECONDARY TRANSFER VOLTAGE: NOT ADJUSTED
- ADJUST SECONDARY TRANSFER VOLTAGE OF LEADING EDGE: NOT ADJUSTED
- ADJUST SECONDARY TRANSFER NEUTRALIZATION BIAS: NOT ADJUSTED
- ADJUST PRIMARY TRANSFER VOLTAGE: NOT ADJUSTED

PAPER LIST

| PAPER NAME | GRAMMAGE | SIZE | WIDTH | HEIGHT | SURFACE NATURE | FEATURE | COLOR |
|---|---|---|---|---|---|---|---|
| THICK PAPER | 300 | A4 | 2970 | 2100 | HIGH QUALITY PAPER | NORMAL | WHITE |
| TWO-SIDED COATED PAPER | 105 | A4 | 2970 | 2100 | TWO-SIDED COATED PAPER | NORMAL | WHITE |
| ONE-SIDED COATED PAPER | 105 | A4 | 2970 | 2100 | ONE-SIDED COATED PAPER | PUNCHED PAPER | WHITE |
| OHP SHEET | 80 | A4 | 2970 | 2100 | OHP | FEATURE | TRANSPARENT PAPER |

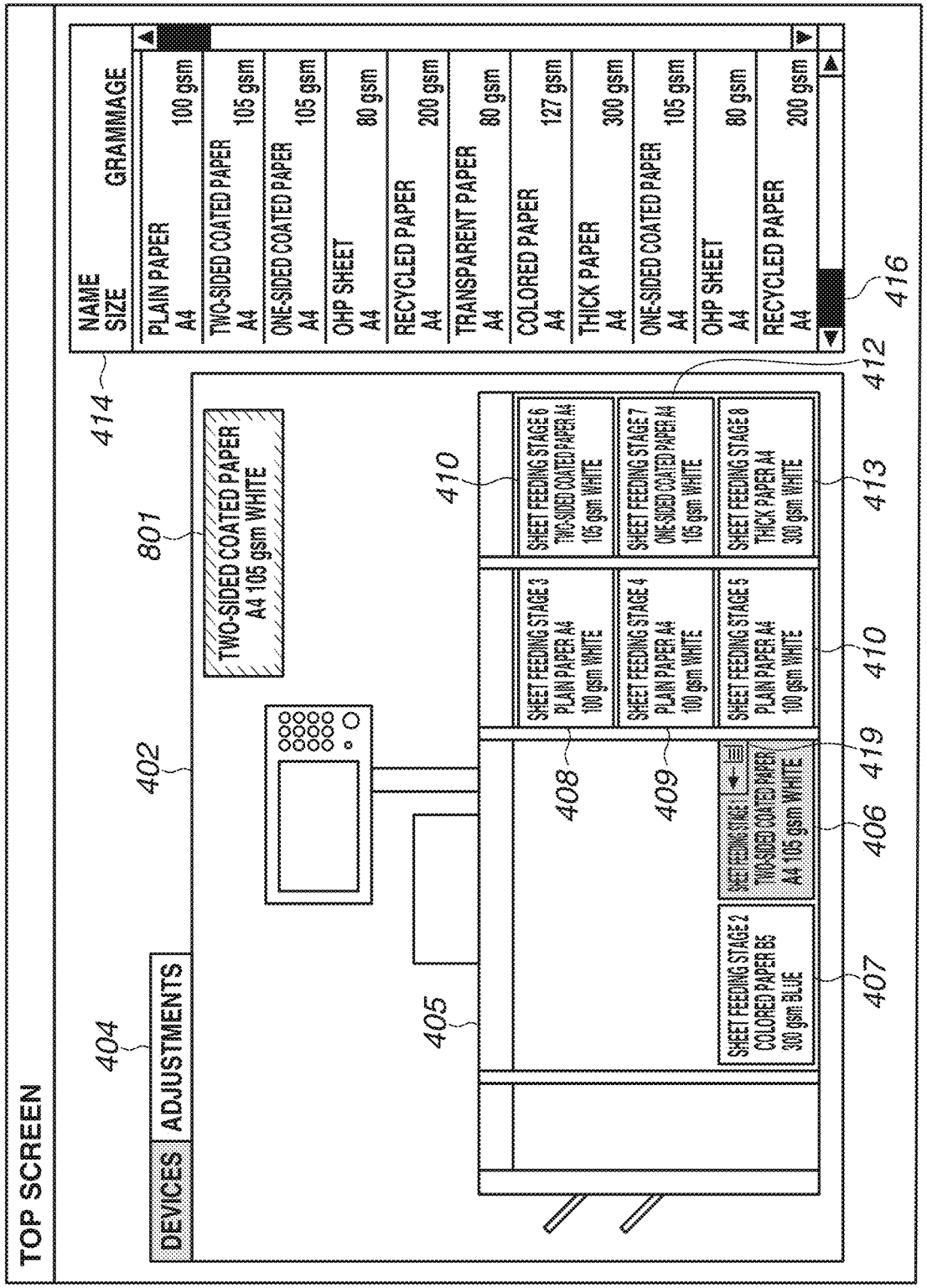

FIG. 9B

IMAGE FORMING SYSTEM FOR PROCESSING SHEET INFORMATION, PRINTING APPARATUS AND METHOD FOR CONTROLLING THE SAME, AND COMPUTER-READABLE STORAGE MEDIUM

BACKGROUND OF THE INVENTION

Field of the Invention

The present disclosure relates to an image forming system, a printing apparatus and a method for controlling the printing apparatus, and a program.

Description of the Related Art

Some printing apparatuses have a plurality of sheet feeding units for storing paper. A user sets paper information on paper to be stored in each sheet feeding unit using the operation panel provided on the printing apparatus or the operation unit provided on an information processing apparatus connected to the printing apparatus in the above-described printing apparatuses, when changing paper to be used for printing, the user sets paper information on the paper to be used for printing in association with a sheet feeding unit. In a printing apparatus discussed in Japanese Patent Application Laid-Open No. 2016-144909, when a user pulls out a sheet feeding unit of the printing apparatus, the printing apparatus displays a screen for setting paper information on paper to be stored in the pulled-out sheet feeding unit on a display unit.

SUMMARY OF THE INVENTION

According to an aspect of the present disclosure, an image forming system includes a printing apparatus including a feeder configured to be pulled out, store sheets, and supply sheets, and an image forming unit configured to form an image on a sheet fed from the feeder, an information processing apparatus configured to communicate with the printing apparatus, and a reception unit configured to receive a user instruction for setting sheet information on a sheet in association with the feeder, wherein, based on sheet information set in association with the feeder, the image forming unit forms an image on a sheet fed from the feeder, wherein the image forming system further comprises: a display unit configured to display information about the feeder, and a detection unit configured to detect that the feeder in a pulled-out state is closed, and wherein the display unit displays the information about the feeder subjected to the user instruction in a first display form and, based on a detection by the detection unit, changes the display by the display unit including the first display form having the information about the feeder to a display including a second display form different from the first display form.

Further features of the present disclosure will become apparent from the following description of embodiments with reference to the attached drawings.

BRIEF DESCRIPTION OF THE DRAWINGS

FIGS. 4A and 4B are diagrams illustrating examples of a home screen of a paper management application according to the present embodiment.

FIG. 5 is a flowchart illustrating processing when the paper management application is activated according to the present embodiment.

FIG. 7 is a sequence diagram illustrating a workflow of the image forming system according to the present embodiment.

FIG. 8 is a diagram illustrating an example of a screen for setting paper to each sheet feeding unit by the paper management application according to the present embodiment.

FIGS. 9A and 9B are diagrams each illustrating an example of the home screen displayed when paper information has been assigned to each sheet feeding unit according to the present embodiment.

DESCRIPTION OF THE EMBODIMENTS

An embodiment of the present disclosure will be described below with reference to the accompanying drawings.

Figure 1:
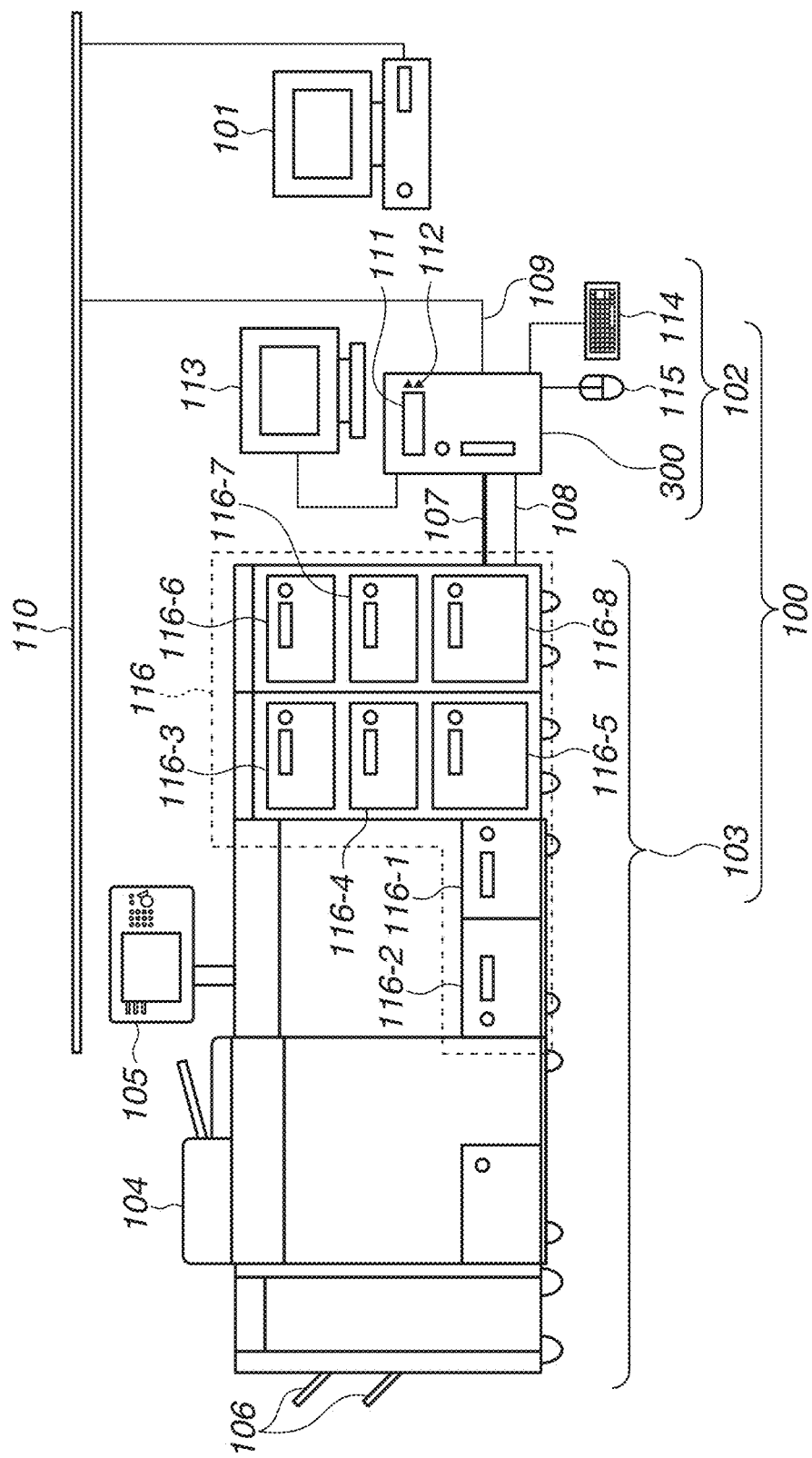
FIG. 1 is a diagram illustrating a configuration of an image forming system according to the present embodiment.

FIG. 1 is a block diagram illustrating an overall configuration of an image forming system 100.

The image forming system 100 illustrated in FIG. 1 includes a printing apparatus 103 and an information processing apparatus 102. The image forming system 100 is connected with a client computer 101 to communicate with each other. The client computer 101 and the information processing apparatus 102 are connected with each other using an Ethernet (registered trademark) cable 109 via a local area network (LAN) 110 to communicate with each other. The information processing apparatus 102 and the printing apparatus 103 are connected with each other via an image video cable 107 and a control cable 108. According to the present embodiment, the printing apparatus 103 is not directly connected to the LAN 110. The printing apparatus 103 and the client computer 101 communicate with each other via the information processing apparatus 102. The printing apparatus 103 may be connected to the LAN 110. More specifically, the printing apparatus 103 may be directly connected with the client computer 101 to communicate with each other.

The client computer 101 activates an application to issue a print instruction to the image forming system 100.

The information processing apparatus 102 performs image processing in cooperation with the printing apparatus 103. The printing apparatus 103 which is a multifunction peripheral having diverse functions can print an image based on image data generated by reading a document using a scanner 104 and transmit the generated image data to a shared folder. When the scanner 104 reads a document, the printing apparatus 103 receives various instructions issued by the user using various keys on an operation unit 105. The display on the operation unit 105 displays various information, such as a scanning state, to the user. A discharge unit 106 receives paper on which an image is formed and discharges the received sheet out of the printing apparatus 103. A display unit 111 is provided on the information processing apparatus 102 and displays information about the information processing apparatus 102. The display unit 111 is used to display information, such as power source operations and IP address confirmation, which may be minimum information needed for the user to operate the information processing apparatus 102. The information processing apparatus 102 is provided with a hardware operation button unit 112. The user operates the information processing apparatus 102 using the operation button unit 112. An external display apparatus 113 is connected to the information processing apparatus 102 and is, for example, a liquid crystal monitor. The information processing apparatus 102 is provided with a keyboard 114 and a pointing device 115, such as a mouse. While, according to the present embodiment described below, the information processing apparatus 102 and the printing apparatus 103 are provided as separate apparatuses and the image forming system 100 includes the information processing apparatus 102 and the printing apparatus 103, the information processing apparatus 102 may be included in the printing apparatus 103 and the following processing may be performed by the printing apparatus 103. The display apparatus 113 may have a position input apparatus function, such as a touch pad, to serve also as the pointing device 115. Sheet feeding units 116-1 to 116-8 (hereinafter collectively referred to as a sheet feeding unit 116) serve as an apparatus for storing paper to be used for printing. As described above, for storing paper, the printing apparatus 103 includes a plurality of sheet feeding units which can be pulled out from the printing apparatus 103. The printing apparatus 103 forms an image on paper fed from the sheet feeding unit 116. The sheet feeding unit 116 is an optional apparatus of the printing apparatus 103. The number of decks included in the sheet feeding unit 116 can be changed. The sheet feeding unit 116 is an example of a feeder capable of storing and supplying paper. Paper is an example of a sheet. Examples of a sheet include an overhead projector (OHP) sheet made of a non-paper material. Paper information is information which indicates the name, size, grammage, and surface nature of paper. The paper information is an example of sheet information. The present embodiment handles sheet information. The printing apparatus 103 forms an image on paper fed from a sheet feeding unit based on the sheet information including the set paper information. The attribute of an OHP sheet is sheet information.

Figure 2:
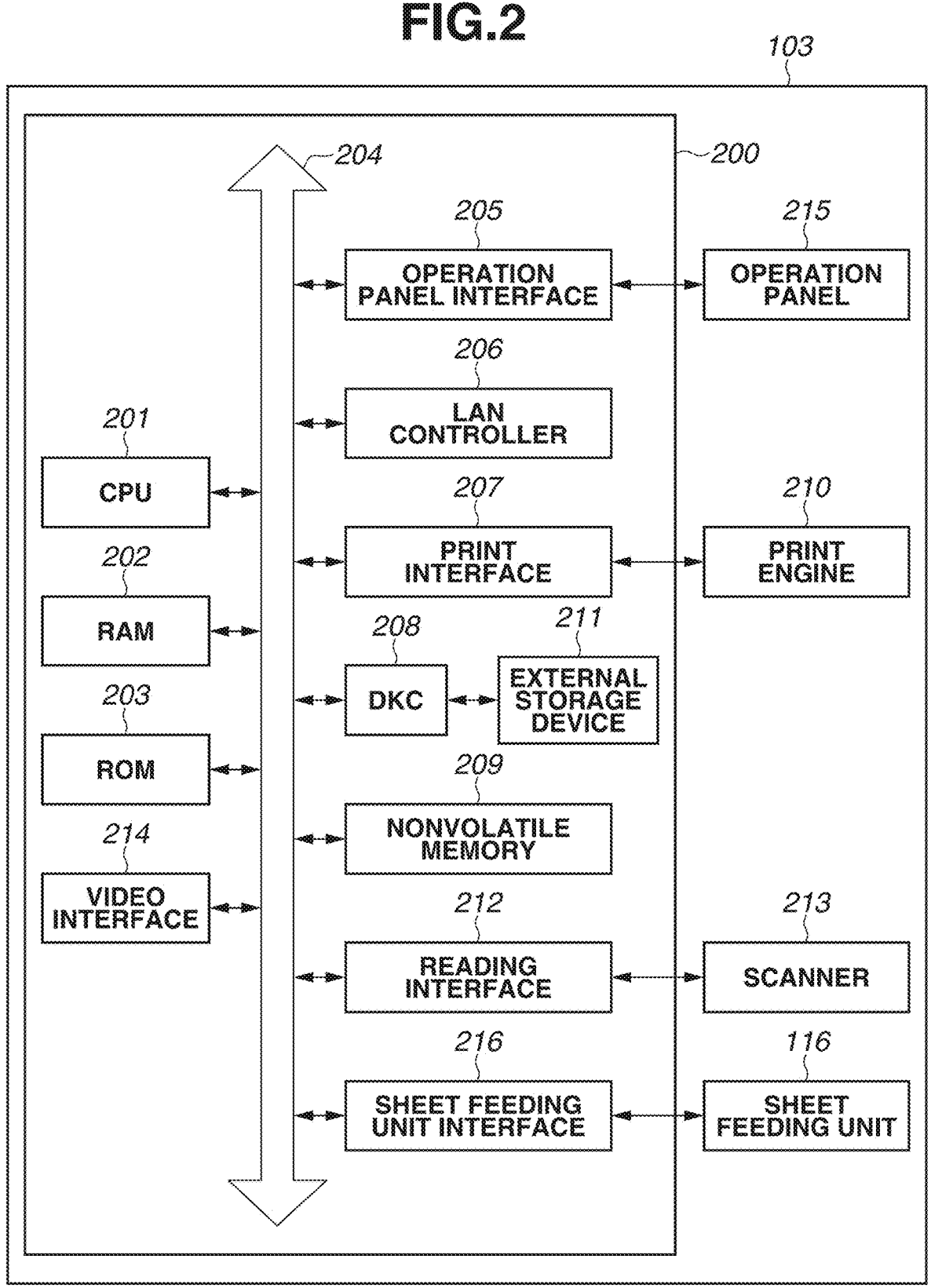
FIG. 2 is a block diagram illustrating a hardware configuration of a printing apparatus according to the present embodiment.

FIG. 2 is a block diagram illustrating a hardware configuration of the printing apparatus 103. The printing apparatus 103 includes a controller 200. The controller 200 includes a central processing unit (CPU) 201 for entirely controlling access to various devices connected to a system bus 204 based on a control program stored in a read only memory (ROM) 203 or an external storage device 211. The CPU 201 outputs an image signal as output information to a printing unit (printer engine) 210 connected via a print interface 207. The CPU 201 further controls an image signal input from a reading unit (scanner) 213 connected via a reading interface 212. The CPU 201 can communicate with the information processing apparatus 102 via a LAN controller 206. A random access memory (RAM) 202 functions mainly as the main memory of the CPU 201 and a work area. The external storage device 211, such as a hard disk drive (HDD) and an integrated circuit (IC) card is tinder access control of a disk controller (DKC) 208. The HDD is used as a job storage area for storing application programs, font data, form data, temporarily spooling a print job, and controlling the spooled job from outside. The HDD is also used as an area for holding image data read by the scanner 104 and image data of a print job as BOX data for reference from a network, and as a BOX data storage area used for printing. According to the present embodiment, the printing apparatus 103 uses the HDD as an external storage device to hold various logs including job logs and image logs. From an operation panel 215, the user can input various information using software keys and hardware keys. An operation panel interface 205 receives a user operation via the operation panel 215. The controller 200 of the printing apparatus 103 uses and transfers coordinate information based on the user operation.

A nonvolatile memory 209 stores various setting information set using a terminal via the operation panel interface 205 or a network. A video interface 214 receives image data from the information processing apparatus 102.

A sheet feeding unit interface 216 acquires a detection result from an open and closed state detection sensor (not illustrated) provided on the sheet feeding unit 116. Information acquired from the sheet feeding unit 116 is used to manage the paper stacking state of the sheet feeding unit 116.

Figure 3A:
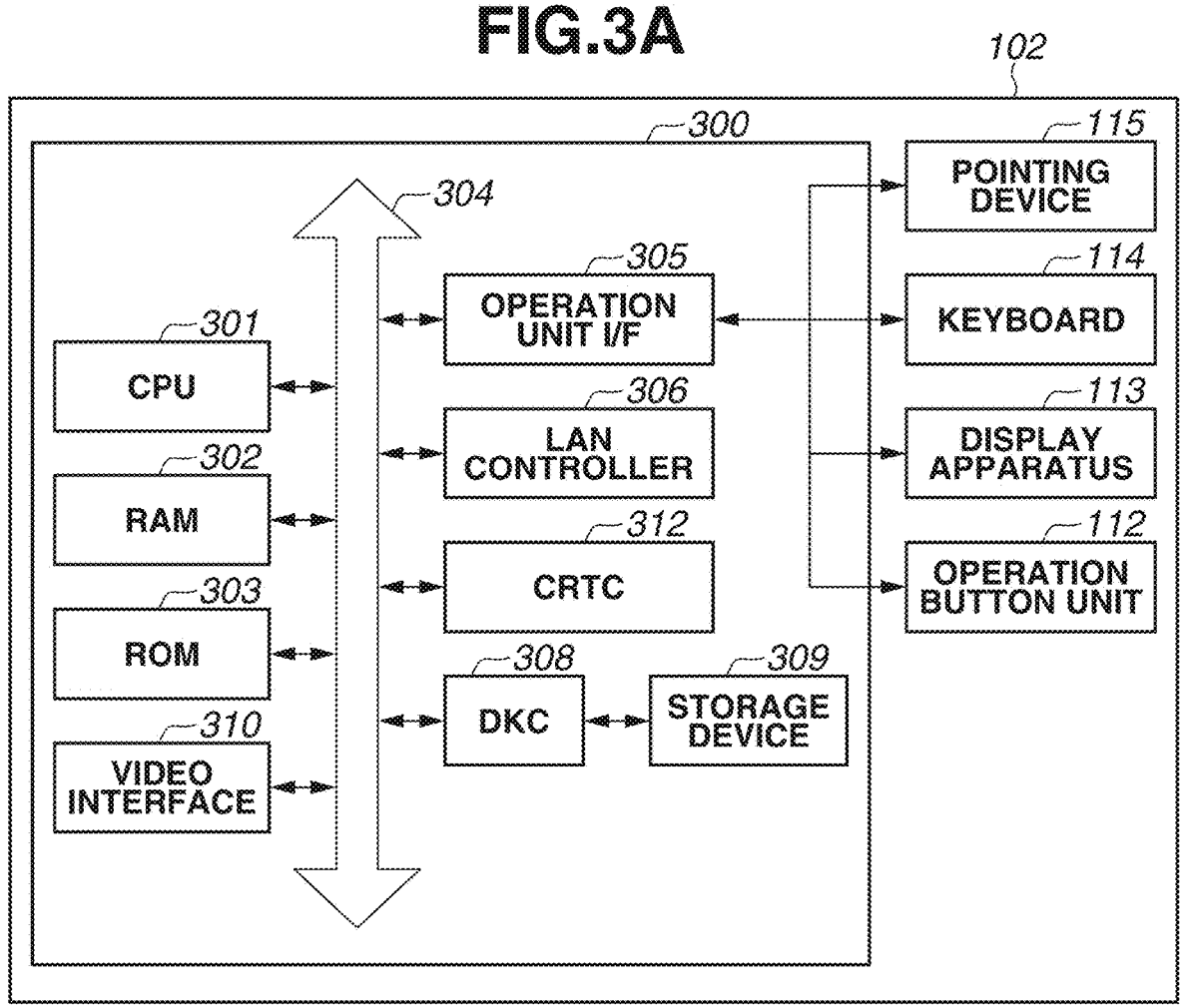
FIG. 3A is a block diagram illustrating a hardware configuration a software configuration of an information processing apparatus according to the present embodiment and FIG. 3B is a block diagram illustrating a software configuration of the information processing apparatus according to the present embodiment.

FIG. 3A is a block diagram illustrating a hardware configuration of the information processing apparatus 102. Referring to the block diagram illustrated in FIG. 3A, the information processing apparatus 102 includes a controller 300. The controller 300 includes a central processing unit CPU 301 for entirely controlling access to various devices connected to a system bus 304 based on a control program stored in a read only memory (ROM) 303 or a storage device 309. The CPU 301 can perform processing for communicating with the printing apparatus 103 via a LAN controller 306. The CPU 301 is also connected with the client computer 101 on a network to communicate with each other via the LAN controller 306. A RAM 302 functions mainly as the main memory of the CPU 301 and a work area. The storage device 309, such as an HDD and an IC card, is under access control of a DKC 308. The HDD is used to store application programs, font data, and form data and temporarily spool a print job. The HDD is used as a job storage area for performing Raster Image Processor (RIP) processing on a spooled job and storing the job again. An operation unit ET 305 receives an input via the pointing device 115, the keyboard 114, and the operation button unit 112 and outputs information for a screen displayed on the operation button unit 112. A video interface 310 transmits image data having undergone the RIP processing to the printing apparatus 103.

Figure 3B:
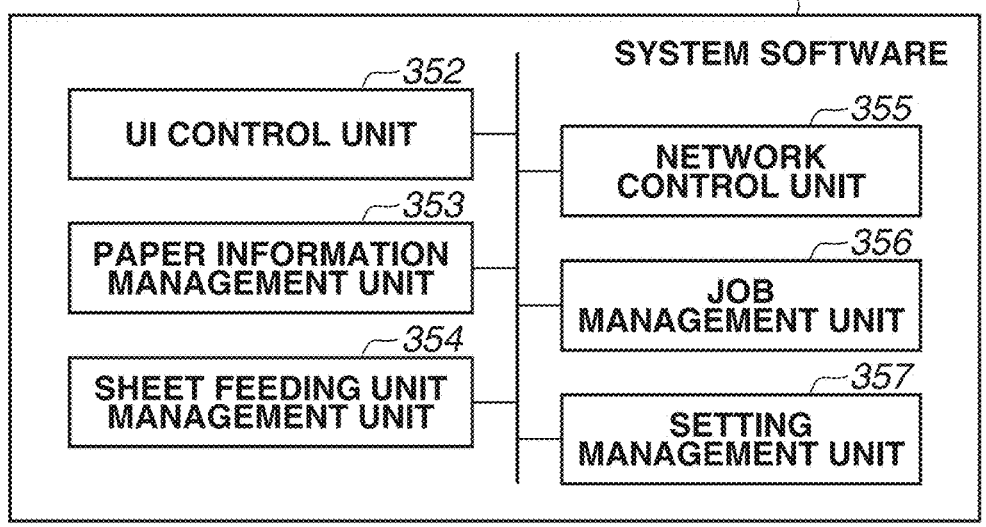

FIG. 3B is a block diagram illustrating a software configuration of the information processing apparatus 102. Each of the software modules is loaded into the RAM 302 of the information processing apparatus 102, called by various programs, and executed by the CPU 301.

The information processing apparatus 102 includes system software 351. A network control unit 355 controls communication with the printing apparatus 103, for example, via the LAN controller 306. The network control unit 355 also controls communication with an external client computer via the LAN controller 306. A job management unit 356 receives a print job from the client computer via the LAN controller 306 and monitors a print job status. A user interface (UI) control unit 352 generates an image indicating a print job status received from the job management unit 356 and a device status received from the sheet feeding unit management unit 354, and displays the image on the display apparatus 113. The UI control unit 352 controls a panel of the display apparatus 113 to acquire coordinate information input by the user via the pointing device 115.

A sheet feeding unit management unit 354 acquires and manages sheet feeding unit information on the printing apparatus 103 via the LAN controller 306. The sheet feeding unit information includes the configuration of sheet feeding units connected to the printing apparatus 103, and paper information on paper set in association with each sheet feeding unit. The sheet feeding unit management unit 354 notifies the printing apparatus 103 of sheet feeding unit information for which a user operation is performed on the display apparatus 113 of the information processing apparatus 102. A paper information management unit 353 synchronizes paper list information stored in the external storage device 211 of the printing apparatus 103 with paper list information stored in the storage device 309 of the information processing apparatus 102 to manage them. A setting management unit 357 manages all settings of a paper management application, such as display language settings.

FIGS. 4A and 4B are diagrams illustrating examples of a home screen 401 of the paper management application. The paper management application operates on the information processing apparatus 102. The user selects an icon of the paper management application displayed on the display unit of the information processing apparatus 102 to activate the paper management application.

FIG. 4A is a diagram illustrating a screen displaying the sheet feeding unit information on the printing apparatus 103. FIG. 4B is a diagram illustrating a screen on which adjustment parameters to be used when the printing apparatus 103 prints an image using each paper type are set. The adjustment parameters to be used when the printing apparatus 103 prints an image include parameters for adjusting the image print position on paper and parameters for adjusting the image transfer voltage. The home screen of the paper management application is drawn in the video memory according to an instruction from the CPU 301, and the image data drawn in the video memory is output to the display apparatus 113 as a video signal and displayed thereon.

FIG. 4A is a diagram illustrating a home screen 401 of the paper management application. A display area 402 included in the home screen 401 can be managed using a tab control. When the user selects a DEVICES tab 403, the screen illustrated in FIG. 4A is displayed. The display area 402 displays the sheet feeding unit information on the printing apparatus 103. When the user presses an "ADJUSTMENTS" tab 404, the screen illustrates in FIG. 4B is displayed. The display area 402 displays buttons with which the user can perform various adjustment setting. A hardware status 405 illustrates connection statuses of hardware options of the printing apparatus 103 connected to the information processing apparatus 102. Hardware options connected to the printing apparatus 103 include a document feeder and a finisher. When the paper management application is activated, the information processing apparatus 102 acquires hardware option information on the printing apparatus 103 and displays an image based on the hardware option information.

The diagram illustrated in FIG. 4A includes sheet feeding unit buttons 406 to 413. The information processing apparatus 102 arranges the sheet feeding unit buttons 406 to 413 based on the information about the sheet feeding unit 116 of the printing apparatus 103 acquired when the paper management application is activated. When a plurality of sheet feeding units is connected to the printing apparatus 103, a plurality of sheet feeding unit buttons is displayed. A display area 414 displays paper information. The paper information displayed in the display area 414 is the paper information stored in the storage device 309 of the information processing apparatus 102. The paper information is displayed for each paper type. If the user wants to display paper information other than the paper information currently displayed, the user operates a slider bar 416. If the user wants to display paper information on paper other than the paper currently displayed, the user operates a slider bar 415.

FIG. 4B illustrates a screen for setting paper information selected by the user from the paper information displayed in the display area 414. Referring to FIG. 4B, "PLAIN PAPER" at the top is selected from the paper information displayed in the display area 414. The screen illustrated in FIG. 4B includes adjustment buttons 417 for allowing the user to set various adjustment items. Referring to FIG. 4B, the display area 402 in which tab control is possible displays adjustment items which can be performed with the printing apparatus 103. In the screen illustrated in FIG. 4B, the user can check setting values of the adjustment items for each paper type. By operating a slider bar 418, the user can check setting values of adjustment items outside the current display area. When the user selects the setting value of each adjustment item in the screen illustrated in FIG. 4B, the information processing apparatus 102 displays a screen for setting the setting value of the selected adjustment item on the display apparatus 113.

FIG. 5 is a flowchart illustrating processing performed by the information processing apparatus 102 to display the home screen 401 illustrated in FIG. 4A when the paper management application is activated. The information processing apparatus 102 performs the processing illustrated in FIG. 5 in response to an instruction for activating the paper management application.

A program related to the flowchart illustrated in FIG. 5 for the information processing apparatus 102 is stored in the storage device 309 illustrated in FIG. 3A. The program is loaded into the RAM 302 and executed by the CPU 301. In step S501, the sheet feeding unit management unit 354 acquires model information on the printing apparatus 103 subjected to paper management. The sheet feeding unit management unit 354 acquires model information on the printing apparatus 103 from the printing apparatus 103 connected to the information processing apparatus 102. The model information refers to information generated in step S601 illustrated in FIG. 6 (described below). The model information on the printing apparatus 103 is used when the hardware status 405 of the hardware currently connected to the present printing apparatus 103 is generated and when a specification difference in each model is adjusted. The sheet feeding unit management unit 354 may use the model information acquired from the printing apparatus 103 as it is or identify the model of the printing apparatus 103 based on the acquired model information and model determination information stored in advance in the paper management application.

In step S502, the sheet feeding unit management unit 354 communicates with the printing apparatus 103 to acquire information about hardware options connected to the printing apparatus 103. The information acquired in step S502 is the information generated in step S602 illustrated in FIG. 6 (described below) and returned from the printing apparatus 103 to the information processing apparatus 102 in step S609. The acquired hardware option information is used when a drawing representing the hardware status 405 of hardware connected to the printing apparatus 103 is generated, when information about sheet feeding units is identified, and when a specification difference in each model is adjusted.

In step S503, the sheet feeding unit management unit 354 acquires sheet feeding unit information on the printing apparatus 103. The sheet feeding unit information acquired in step S503 is the information generated in step S603 illustrated in FIG. 6 (described below) and returned from the printing apparatus 103 to the information processing apparatus 102 in step S611. The sheet feeding unit information includes sheet feeding unit configurations, for example, an option deck, a manual feed tray, and a long sheet tray. The sheet feeding unit information also includes the number of sheet feeding units connected to the printing apparatus 103.

In step S504, the sheet feeding unit management unit 354 communicates with the printing apparatus 103 to acquire the paper information set for each sheet feeding unit. The sheet feeding unit management unit 354 acquires the paper information set in association with each sheet feeding unit based on the information returned in step S611 illustrated in FIG. 6.

In step S505, the sheet feeding unit management unit 354 generates information about the sheet feeding unit buttons 406 to 413 displayed in the hardware status 405. In step S505, based on the information acquired in steps S503 and S504, the sheet feeding unit management unit 354 determines the arrangements of the sheet feeding unit buttons 406 to 413 to be displayed in the hardware status 405 and character strings to be displayed on the sheet feeding unit buttons 406 to 413.

In step S506, the paper information management unit 353 acquires paper list information from the printing apparatus 103. In step S506, the paper information management unit 353 acquires the paper list information returned from the printing apparatus 103 in step S613 illustrated in FIG. 6 (described below). In step S507, based on the paper list information acquired in step S506, the paper information management unit 353 generates paper list information to be displayed in the display area 414.

In step S508, the paper information management unit 353 acquires the adjustment value of each adjustment item from the printing apparatus 103. The information acquired by the paper information management unit 353 in step S508 is the information returned from the printing apparatus 103 in step S615 illustrated in FIG. 6. The information acquired in step S508 is used to display the adjustment buttons 417. In step S508, the paper information management unit 353 may acquire setting information on each adjustment item for the entire paper information or acquire setting information on extension items only for the paper information at the top of the paper list.

In step S509, the paper information management unit 353 generates character strings to be displayed on the buttons. When there is only one adjustment value, the adjustment value is displayed. When there are two or more adjustment values, "ADJUSTED/NOT ADJUSTED" is displayed.

In step S510, the UI control unit 352 generates the home screen 401 based on model hardware option information, sheet feeding unit button information, paper list information, and adjustment button information for the printing apparatus 103, and displays the home screen 401 on the display apparatus 113.

The above processing has been described as operations performed when the paper management application is activated. However, the sheet feeding unit information, paper list information, and adjustment values of the printing apparatus 103 may possibly be changed as the need arises during operation of the paper management application. In view of such a case, the information processing apparatus 102 performs the above-described processing in a case where the user changes the paper information on paper associated with each sheet feeding unit by operating the paper management application, or at an arbitrary timing when the sheet feeding unit configuration set in the printing apparatus 103 is changed.

Figure 6:
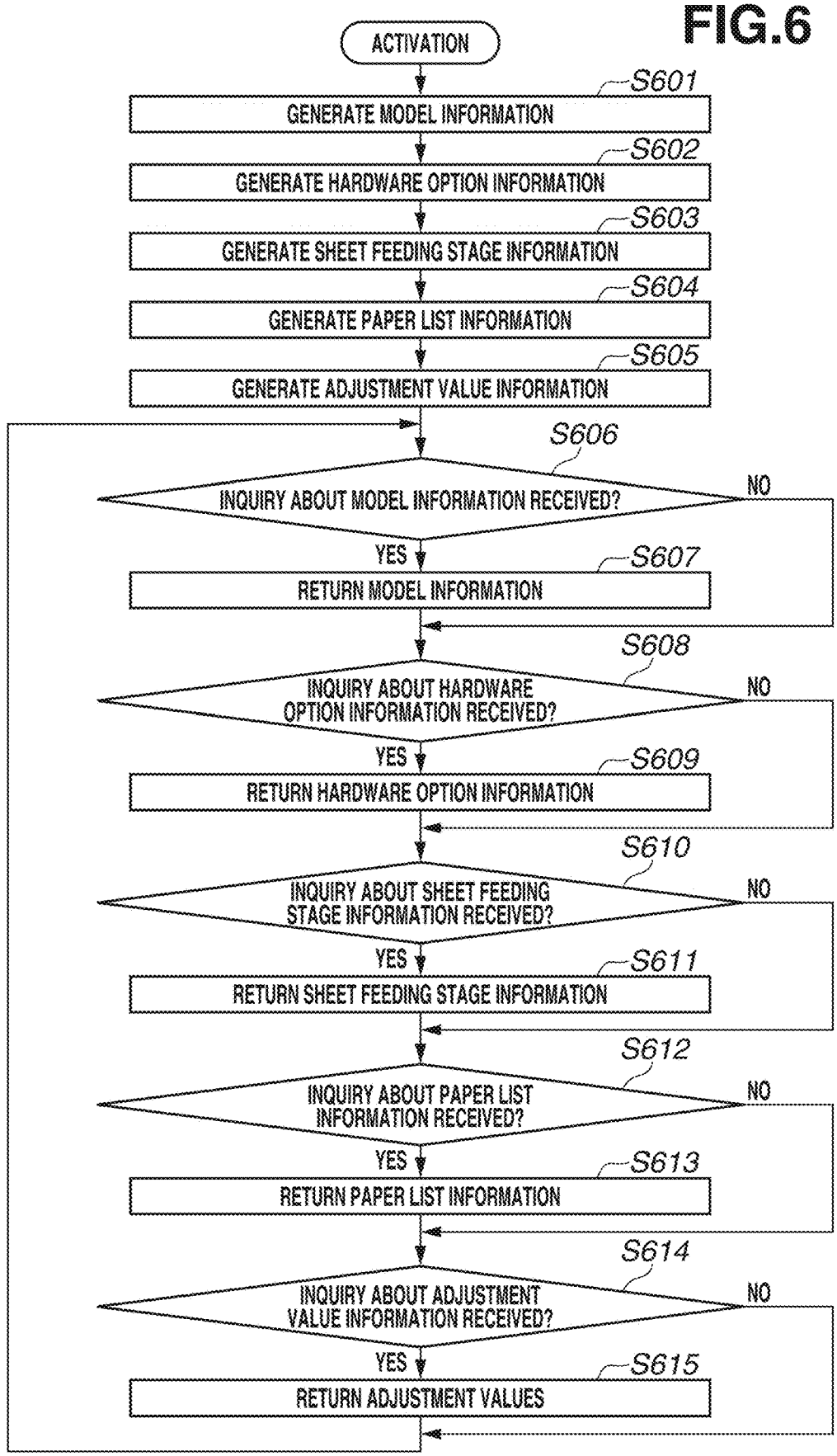
FIG. 6 is a flowchart illustrating processing when the printing apparatus is activated according to the present embodiment.

FIG. 6 is a flowchart illustrating processing for generating information which is used for synchronization between the printing apparatus 103 and the information processing apparatus 102. The printing apparatus 103 performs the processing by communicating with the paper management application of the information processing apparatus 102, when the printing apparatus 103 is activated.

A program of the printing apparatus 103 related to the processing illustrated in FIG. 6 stored in the external storage device 211 illustrated in FIG. 2 is loaded into the RAM 202 and then executed by the CPU 201. When the printing apparatus 103 is activated, the CPU 201 starts the processing in step S601.

In step S601, the CPU 201 acquires model information on the printing apparatus 103 from the external storage device 211 and generates data that can be returned to the information processing apparatus 102. In step S602, the CPU 201 acquires information about hardware options connected to the printing apparatus 103 from the external storage device 211 and generates data that can be returned to the information processing apparatus 102. In step S603, the CPU 201 acquires the sheet feeding unit information on the printing apparatus 103 from the external storage device 211 and generates data that can be returned to the information processing apparatus 102. In step S604, the CPU 201 acquires the paper list information on the printing apparatus 103 from the external storage device 211 and generates data that can be returned to the information processing apparatus 102. In step S605, the CPU 201 acquires, from the external storage device 211, adjustment value information on each paper type included in the paper list information stored in the external storage device 211, and generates data that can be returned to the information processing apparatus 102. The adjustment value information acquisition is performed for all items that can be adjusted by the printing apparatus 103. The adjustment value information acquisition may be performed for all paper types or only for the paper type displayed at the top of the paper list.

In step S606, the CPU 301 determines whether an inquiry about the model information is received from the information processing apparatus 102. When performing the processing illustrated in step S501 illustrated in FIG. 5, the information processing apparatus 102 makes an inquiry to the printing apparatus 103 about the model information. When an inquiry about the model information is received from the information processing apparatus 102 (YES in step S606), the processing proceeds to step S607. In step S607, the CPU 201 returns the model information generated in step S601 to the information processing apparatus 102. After completion of the processing in step S607, the processing proceeds to step S608. Meanwhile, when an inquiry about the model information is not received from the information processing apparatus 102 (NO in step S606), the processing proceeds to step S608.

In step S608, the CPU 201 determines whether an inquiry about the hardware option information is received from the information processing apparatus 102. When an inquiry about the hardware option information is received from the information processing apparatus 102 (YES in step S608), the processing proceeds to step S609. In step S609, the CPU 201 returns the hardware option information generated in step S602 to the information processing apparatus 102. After completion of the processing in step S609, the processing proceeds to step S610. Meanwhile, when an inquiry about the hardware option information is not received (NO in step S608), the processing proceeds to step S610.

In step S610, the CPU 201 determines whether an inquiry about the sheet feeding unit information is received from the information processing apparatus 102. When the information processing apparatus 102 performs the processing in steps S503 and S504 illustrated in FIG. 5, the information processing apparatus 102 receives an inquiry about the sheet feeding unit information. When an inquiry about the sheet feeding unit information is received (YES in step S610), the processing proceeds to step S611. In step S611, the CPU 201 returns the sheet feeding unit information generated in step S603 to the information processing apparatus 102. After completion of the processing in step S611, the processing proceeds to step S612. Meanwhile, when an inquiry about the sheet feeding unit information is not received (NO in step S610), the CPU 201 performs processing in step S612.

In step S612, the CPU 201 determines whether an inquiry about the paper list information is received from the information processing apparatus 102. When the information processing apparatus 102 has transmitted an inquiry about the paper list information in steps S506 and S507 illustrated in FIG. 5, the CPU 201 receives an inquiry about the paper list information. When the CPU 201 receives an inquiry about the paper list information (YES in step S612), the processing proceeds to step S613. In step S613, the CPU 201 returns the paper list information generated in step S604 to the paper management application. After completion of the processing in step S613, the processing proceeds to step S614. Meanwhile, when an inquiry about the paper list information is not received (NO in step S612), the processing proceeds to step S614.

In step S614, the CPU 201 determines whether an inquiry about the adjustment value information is received from the information processing apparatus 102. When the information processing apparatus 102 has transmitted an inquiry about the adjustment value information acquired in step S508 illustrated in FIG. 5, the CPU 201 determines that an inquiry about the adjustment value information is received. When the CPU 201 determines that an inquiry about the adjustment value information is received (YES in step S614), the processing proceeds to step S615. In step S615, the CPU 201 returns the adjustment value information generated in step S605 to the information processing apparatus 102. Then, the processing returns to step S606. Meanwhile, when an inquiry about the adjustment value information is not received (NO in step S614), the processing returns to step S606. Subsequently, the CPU 201 performs the processing in steps S606 to S615 at a timing when an inquiry about arbitrary model information is received from the information processing apparatus 102. When power of the printing apparatus 103 is turned OFF, the CPU 201 ends the processing in FIG. 6.

The sheet feeding units according to the present embodiment include a feed deck, inserter, manual feed tray, and other sheet feed mechanisms, and are not limited to a specific form.

As described above, the processing of when the printing apparatus 103 is activated and when the paper management application is activated is performed.

A workflow of a use case according to the present embodiment will be described below with reference to FIG. 7. Although, in the following descriptions, the description of the use of the pointing device 115 during operation of the paper management application, such as depression of buttons, will be omitted, the user presses buttons and performs other operations by using such an input device. When the user activates the paper management application and turns ON power of the printing apparatus 103, initialization processing 1001 is performed. The initialization processing 1001 refers to the processing illustrated in FIGS. 5 and 6. In step 1002, the user selects a sheet feeding unit button subjected to paper information setting from among the sheet feeding unit buttons 406 to 413 displayed on the home screen 401 and issues a user instruction for setting the paper information. A user instruction for setting the paper information in association with each sheet feeding unit is, for example, a user instruction for setting paper information different from the set paper information, in association with each sheet feeding unit. User instructions for setting the paper information in association with each sheet feeding unit include a user instruction for setting the paper information corresponding to a sheet feeding unit which is not associated with the paper information and a user instruction for setting the same paper information as the set paper information in association with each sheet feeding unit. When the user selects the sheet feeding unit button 406 displayed on the home screen 401, the paper setting screen illustrated in FIG. 8 is displayed. As an example, a case where the user selects the sheet feeding unit button 406 will be described below. The paper setting screen displayed when the user selects any one of the sheet feeding unit buttons 407 to 413 has the same configuration as the paper setting screen displayed when the user selects the sheet feeding unit button 406, and the description thereof will be omitted. Although not described in detail in the present embodiment, a similar screen is also displayed when the user selects a document feeder other than the sheet feeding unit buttons 406 to 413, such as an inserter and a manual feed tray.

FIG. 8 is a diagram illustrating a paper information setting screen for a sheet feeding stage 1. According to an instruction from the CPU 301, the paper information setting screen 700 for the sheet feeding stage 1 is drawn in the video memory and, at the same time, the image data drawn in the video memory is output to the display apparatus 113 as a video signal and displayed thereon. The name of the sheet feeding unit selected by the user is displayed on an area 701.

The paper information setting screen 700 displays a paper information area 702, a paper list display area 703, an "ASSIGN" button 704, an UPDATE PAPER LIST button 705, and a CLOSE button 706. The paper information area 702 displays detailed setting values of the selected paper information. The paper list display area 703 displays the paper list stored in the storage device 309 of the information processing apparatus 102. When the user selects paper information from the paper list display area 703, detailed setting values of the selected paper information are displayed in the paper information area 702.

Input items displayed in the paper information area 702 will be described below. A text area 707 allows the user to input the name of paper. When changing the name, the user inputs characters in the text area 707, for example, using the keyboard 114. Although, in the following descriptions, the description of the use of the keyboard 114 when the user inputs characters will be omitted, the user inputs characters using such an input device. To reflect the change in the paper information, the user selects the "UPDATE PAPER LIST" button 705. By pressing the "UPDATE PAPER LIST" button 705, the paper information stored in the storage device 309 of the information processing apparatus 102 and the external storage device 211 of the printing apparatus 103 can be changed. In a text area 708, the user can input the grammage. The operation of this text area is equivalent to the operation of the "NAME" text area 707, the description thereof will be omitted. A combo box 709 displays paper size information. The user can select and set a desired size from the paper size information displayed in a list in the combo box 709. To reflect the size information to the changed paper information, the user presses the "UPDATE PAPER LIST" button 705. By pressing the "UPDATE PAPER LIST" button 705, the paper information stored in the storage device 309 of the information processing apparatus 102 and the external storage device 211 of the printing apparatus 103 can be changed. A combo box 710 displays a surface nature information. The operation of this combo box is equivalent to the operation of the combo box 709 for a paper size, the description thereof will be omitted. A combo box 711 displays feature information. The feature information refers to information about whether the paper is plain paper or punched paper. The operation of this combo box is equivalent to the operation of the combo box 709 for a paper size, the description thereof will be omitted. A combo box 712 displays color information. The operation of this combo box is equivalent to the operation of the combo box 709 for a paper size, the description thereof will be omitted. A combo box 713 displays second surface information on two-sided paper. The operation of this combo box is equivalent to the operation of the combo box 709 for a paper size, the description thereof will be omitted. A combo box 714 displays fiber information. The operation of this combo box is equivalent to the operation of the combo box 709 for a paper size, the description thereof will be omitted. An area 715 collectively displays the adjustment values of the adjustment items at the time of printing. Since there are many adjustment items to be used at the time of printing, not all of adjustment items can be fit into the area 715. Setting values of setting items outside the current display area can be displayed by operating a slider bar 716. An "ADJUST IMAGE POSITION" button 717 is a setting item button for adjusting the image position and displays whether the current paper has already been adjusted. When the current paper has already been adjusted, "ADJUSTED" is displayed. On the other hand, when the current paper has not yet been adjusted, "NOT ADJUSTED" is displayed. When the user presses the "ADJUST IMAGE POSITION" button 717, an adjustment screen (not illustrated) is displayed on the display apparatus 113. The user can input various adjustment values in the adjustment screen (not illustrated). To reflect the changed information to the paper information, the user presses the "UPDATE PAPER LIST" button 705. After setting adjustment values, by pressing the "UPDATE PAPER LIST" button 705, the paper information stored in the information processing apparatus 102 and the printing apparatus 103 can be updated. A "CORRECT CURL" button 718 is a setting item button for correcting curls. The operation of this button is equivalent to the operation of the "ADJUST IMAGE POSITION" button 717 for the setting item, the description thereof will be omitted. An "ADJUST SADDLE STITCH FOLD POSITION" button 719 is a setting item button for adjusting the saddle stitch fold position. The current adjustment values are displayed on this button in unit of mm. By pressing the "ADJUST SADDLE STITCH FOLD POSITION" button 719 for the setting item opens the adjustment screen. Various adjustment values can be input on this adjustment screen. To reflect the changed information to the paper information, the user selects the "UPDATE PAPER LIST" button 705. By pressing the "UPDATE PAPER LIST" button 705, the paper information on the information processing apparatus 102 and the printing apparatus 103 are updated. An "ADJUST CREEP CORRECTION AMOUNT" button 720 is a setting item button for adjusting the amount of creep correction. The operation of this button is equivalent to the operation of the "ADJUST SADDLE STITCH FOLD POSITION" button 719 for the setting item, the description thereof will be omitted. An "ADJUST SADDLE STITCH BINDING FOLD POSITION" button 721 is a setting item button for adjusting the saddle stitch binding fold position. The operation of this button is equivalent to the operation of the "ADJUST SADDLE STITCH FOLD POSITION" button 719 for the setting item, the description thereof will be omitted. A "CHANGE SADDLE STITCH BINDING POSITION" button 722 is a setting item button for adjusting the saddle stitch binding position. The operation of this button is equivalent to the operation of the "ADJUST SADDLE STITCH FOLD POSITION" button 719 for the setting item, the description thereof will be omitted. An "ADJUST SECONDARY TRANSFER VOLTAGE" button 723 is a setting item button for adjusting the secondary transfer voltage. The operation of this button is equivalent to the operation of the "ADJUST IMAGE POSITION" button 717 for the setting item, the description thereof will be omitted. An "ADJUST SECONDARY TRANSFER VOLTAGE OF LEADING EDGE" button 724 is a setting item button for adjusting the secondary transfer voltage of the leading edge. The operation of this button is equivalent to the operation of the "ADJUST IMAGE POSITION" button 717 for the setting item, the description thereof will be omitted. An "ADJUST SECONDARY TRANSFER NEUTRALIZATION BIAS" button 725 is a setting item button for adjusting the secondary transfer neutralization bias. The operation of this button is equivalent to the operation of the "ADJUST IMAGE POSITION" button 717 for the setting item, the description thereof will be omitted. An "ADJUST PRIMARY TRANSFER VOLTAGE" button 726 is a setting item button for adjusting the primary transfer voltage. The operation of this button is equivalent to the operation of the "ADJUST IMAGE POSITION" button 717 for the setting item, the description thereof will be omitted.

The paper list display area 703 will be described below. A table 727 displays a paper list. Information about each paper type is displayed in each row. When the user operates a slider bar 728, setting values of setting items outside the current display area are displayed. When the user operates a slider bar 729, paper information outside the current display area is displayed in the table 727. Paper information 730 is the paper information currently displayed in the paper information area 702. The paper information 730 is highlighted to indicate that it is currently selected. Paper information 731 to 733 is paper information not currently displayed in the paper information area 702. When the user selects any one of unselected paper information 731 to 733 from among the paper list in the table 727, information about the selected paper is displayed in the paper information area 702. In this state, by pressing the "ASSIGN" button 704, the selected paper information can be newly assigned to the sheet feeding unit 116. To close the screen without changing any setting value, the user presses the CLOSE button 706.

According to the present embodiment, when the user selects a sheet feeding unit button and then selects the "ASSIGN" button 704 in the screen illustrated in FIG. 8, the paper information is assigned to the sheet feeding unit. However, the method of assigning the paper information to a sheet feeding unit is not limited thereto. Alternatively, for example, in the home screen 401, the user moves the cursor to the paper type to be assigned to a sheet feeding unit from the paper list, clicks the mouse button, drags the mouse to a target sheet feeding unit, and drops the paper type on the target sheet feeding unit. By such an operation, the information processing apparatus 102 pray assign the paper information selected to the sheet feeding unit.

When the user assigns the paper information to the sheet feeding unit, then in step 1003, the paper management application registers the selected sheet feeding unit button 406 and the selected paper information in an associated way. In step 1004, the paper management application transmits an instruction for assigning and registering the selected paper information to the sheet feeding unit 116-1 connected to the printing apparatus 103. In step 1005, upon reception of the instruction from paper management application, the printing apparatus 103 registers the sheet feeding unit 116-1 and the paper information in an associated way. After completion of the registration of the paper information to the sheet feeding unit 116-1, then in step 1006, the printing apparatus 103 notifies the paper management application that the paper information has been registered to the sheet feeding unit 116-1. Upon receipt of the notification about the registration of the paper information to the sheet feeding unit 116-1 from the printing apparatus 103, then in step 1007, the paper management application displays a screen in which the sheet feeding unit button 406 is highlighted on the display apparatus 113. An example of a screen in which the sheet feeding unit button 406 is highlighted is illustrated in FIG. 9A. Referring to FIG. 9A, the sheet feeding unit button 406 is displayed in a color different from colors of other sheet feeding unit buttons. In this way, the sheet feeding unit button 406 for which the paper information has been set is displayed in a display form different from display forms of other sheet feeding unit buttons. This allows the user to immediately recognize that the sheet feeding unit to which the paper information has been assigned is the sheet feeding unit corresponding to the sheet feeding unit button 406. In addition, the paper information set for the sheet feeding unit button 406 by the user is displayed in an area 801. In this way, the paper information assigned to the sheet feeding unit is separately displayed from the corresponding sheet feeding unit button 406. This allows the user to immediately check the paper information on the paper to be supplied.

Figure 9B:
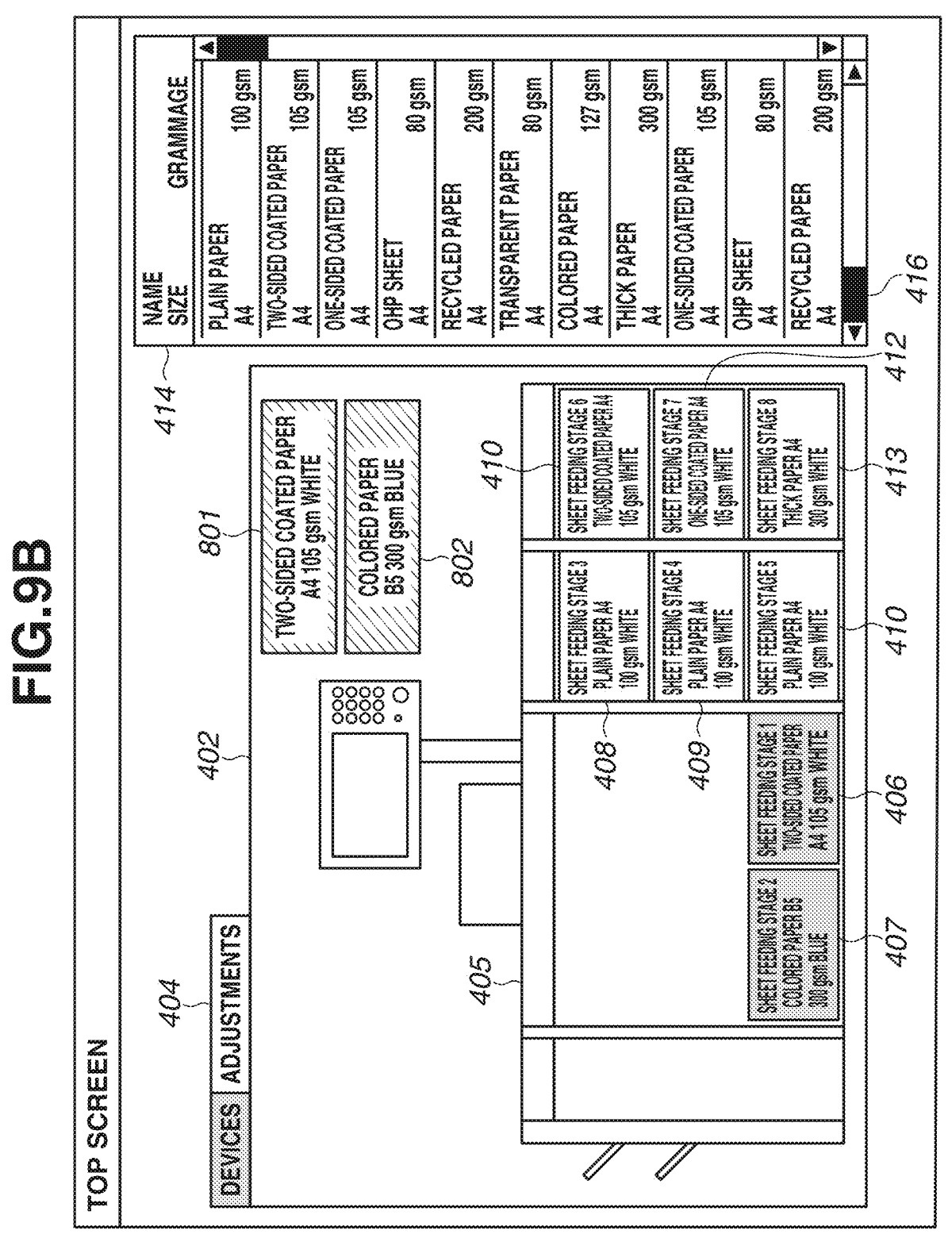

According to the present embodiment, only the sheet feeding unit button 406 is highlighted. However, when the user successively registers the paper information to a plurality of sheet feeding units, all of the sheet feeding unit buttons to which the paper information has been registered are highlighted. For example, when the user registers the paper information to the sheet feeding units 116-1 and 116-2, as illustrated in FIG. 9B, the sheet feeding unit buttons 406 and 407 are highlighted.

After completion of the assignment of the paper information, then in step 1009, the user pulls out the sheet feeding unit 116-1 of the printing apparatus 103 to actually supply paper therein. Each sheet feeding unit may be manually pulled out by the user or automatically pulled out when the user presses a button provided on the sheet feeding unit. The pulled-out state of a sheet feeding unit is detected by a sensor (not illustrated) provided on the sheet feeding unit. When the sheet feeding unit 116-1 is pulled out, then in step 1010, the printing apparatus 103 notifies the paper management application that the sheet feeding unit 116-1 has been pulled out. In step 1011, the paper management application changes the display of the sheet feeding unit button 406 to the opened state. The paper management application displays the pulled-out state of a sheet feeding unit, for example, by displaying a sheet feeding unit open icon 419. As described above, by displaying the sheet feeding unit open icon 419 on the sheet feeding unit button of a pulled out sheet feeding unit, the sheet feeding unit can be distinguishably displayed from other sheet feeding units. After pulling out the sheet feeding unit 116-1, then in step 1012, the user supplies paper in the sheet feeding unit 116-1.

In step 1013, the user closes the sheet feeding unit 116-1. The sheet feeding unit 116-1 may be manually closed when the user pushes in the sheet feeding unit 116-1 or automatically closed when the user presses a button provided on the sheet feeding unit 116-1. A state transition of a sheet feeding unit from the pulled-out state to the closed state is detected by a physical sensor provided on the sheet feeding unit. When the sheet feeding unit 116-1 is pushed in all the way until it stops, then in step 1014, the printing apparatus 103 detects that the sheet feeding unit 116-1 has been closed. In step 1015, the printing apparatus 103 notifies the paper management application that the sheet feeding unit 116-1 has been closed. Upon receipt of the notification notifying that the sheet feeding unit 116-1 has been closed from the printing apparatus 103, then in step 1016, the paper management application changes the display of the sheet feeding unit button 406 to the closed state. For example, the paper management application ends the display of the sheet feeding unit open icon 419. In step 1017, the paper management application ends the highlight display of the sheet feeding unit button 406, in response to the closing of a sheet feeding unit, the paper management application ends the highlight display of the sheet feeding unit button corresponding to the sheet feeding unit closed. This allows the user to know which sheet feeding unit has been supplied with paper. When the paper information is assigned to two or more sheet feeding units, as illustrated in FIG. 9B, the paper management application ends the highlight display of only the sheet feeding unit which has been supplied with paper after paper assignment is made. The above-described processing allows the user to immediately check which sheet feeding units have been supplied with paper and which sheet feeding units have not yet been supplied with paper, among the sheet feeding units to which the paper information has been assigned.

In the description of the workflow illustrated in FIG. 7, the sheet feeding unit button 406 is highlighted immediately after the paper information has been set for the corresponding sheet feeding unit. However, the sheet feeding unit button 406 may be highlighted in response to the depression of the area 801 displaying the paper information, via the pointing device 115.

According to the present embodiment, when the paper information has been set for a plurality of sheet feeding units, the sheet feeding unit buttons corresponding to all of the sheet feeding units for which the paper information has been set are highlighted. When the paper information has been successively set for a plurality of sheet feeding units, the sheet feeding unit buttons may be highlighted in order of setting the paper information. For example, when the paper information has been set for the sheet feeding stages 1 and 2 in this order, the paper management application highlights the sheet feeding unit button 406 and does not highlight the sheet feeding unit button 407. Subsequently, when the user supplies paper in the sheet feeding unit corresponding to the sheet feeding unit button 406 and then closes the sheet feeding unit, the paper management application ends the highlight display of the sheet feeding unit button 406 and highlights the sheet feeding unit button 407. In this case, the paper management application first displays the paper information set for the sheet feeding stage 1, in the area 801. Subsequently, upon detection of the opened/closed state of the sheet feeding stage 1, the paper management application displays the paper information set for the sheet feeding stage 2, in the area 801.

The present embodiment has been described above centering on a case where the user operates the paper management application screen displayed on the display apparatus 113 connected to the information processing apparatus 102. The user may perform setting for assigning paper information to a sheet feeding stage using the operation unit 105 of the printing apparatus 103. Paper information may be set for a feed deck using a method other than the screen illustrated in FIG. 8. In this case, the setting form is not limited.

Figure 10:
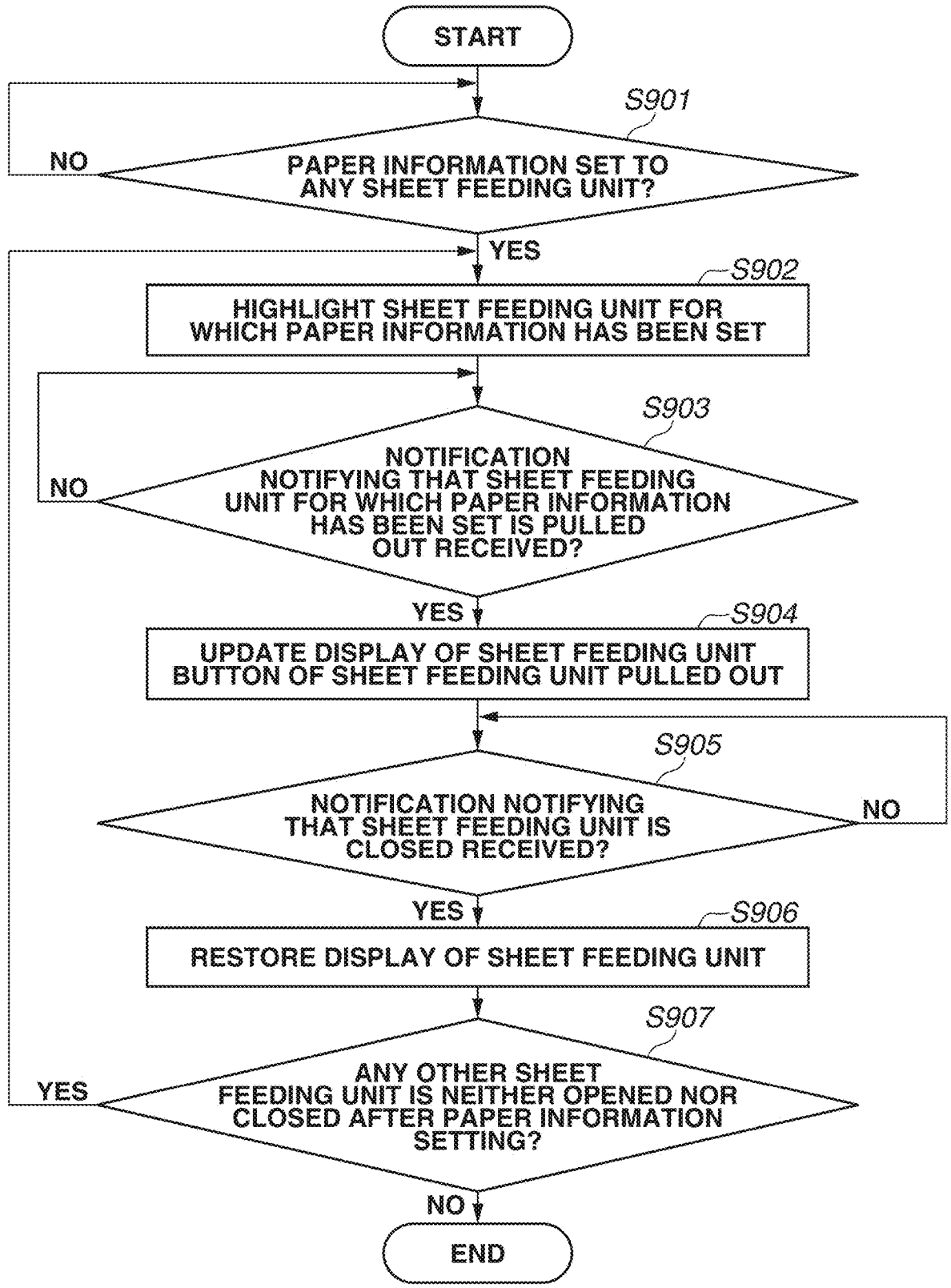
FIG. 10 is a flowchart illustrating processing executed by the information processing apparatus according to the present embodiment.

Processing as a feature of the present embodiment will be described below with reference to the flowchart illustrated in FIG. 10. A program of the information processing apparatus 102 related to the processing procedure of the flowchart stored in the HDD 309 of the information processing apparatus 102 is loaded into the RAM 302 and then executed by the CPU 301. The processing illustrated in FIG. 10 is performed when the user registers paper information on paper to be supplied to each sheet feeding unit by using the paper management application. More specifically, the paper management application waits until the user performs operations for assigning paper information to each sheet feeding unit, for example, after the activation processing is completed.

In step S901, the sheet feeding unit management unit 354 determines whether paper information on any sheet feeding unit has been changed. When the sheet feeding unit management unit 354 detects that paper information corresponding to any sheet feeding unit has been changed (YES in step S901), the processing proceeds to S902. In step S902, the control unit 352 displays a screen on the display apparatus 113. In the screen, the feed deck for which the paper information has been set is highlighted. In this case, the set paper information may be displayed at a portion different from the paper information list and the sheet feeding unit buttons, as illustrated in FIG. 9A. When the user selects the displayed paper information, the sheet feeding unit associated with the selected paper information may be highlighted.

Meanwhile, when the sheet feeding unit management unit 354 does not detect that paper information on any sheet feeding unit has been set (NO in step S901), the sheet feeding unit management unit 354 continuously performs the processing in step S901.

In step S903, the sheet feeding unit management unit 354 determines whether a notification notifying that the highlighted sheet feeding unit for which the paper information has been set is pulled out has been received. In response to the receipt of a notification notifying that the sheet feeding unit for which the paper information has been set is pulled out (YES in step S903), the processing proceeds to step S904. On the other hand, when the notification is not received (NO in step S903), the sheet feeding unit management unit 354 continuously performs the processing in step S903 until the sheet feeding unit for which the paper information has been set is pulled out.

Upon reception of a notification notifying that the sheet feeding unit for which the paper information has been set is pulled out, then in step S904, the control unit 352 updates the display of the sheet feeding unit button to the display indicating the pulled-out state of the sheet feeding unit.

In step S905, the sheet feeding unit management unit 354 determines whether a notification notifying that the sheet feeding unit is closed is received from the printing apparatus 103. When the sheet feeding unit management unit 354 determines that a notification notifying that the sheet feeding unit is closed is received (YES in step S905), the processing unit proceeds to step S906. On the other hand, when a notification notifying that the sheet feeding unit is closed is not received (NO in step S905), the sheet feeding unit management unit 354 continuously performs the processing in step S905.

In step S906, the UI control unit 352 ends the highlight display of the sheet feeding unit button corresponding to the sheet feeding unit closed.

In step S907, the sheet feeding unit management unit 354 determines whether any other sheet feeding unit has been neither opened nor closed after setting the paper information. When a sheet feeding unit having been neither opened nor closed after setting the paper information exists (YES in step S907), the processing returns to step S902. Then, the sheet feeding unit management unit 354 performs processing similar to the above-described processing. When all of the sheet feeding units for which the paper information has been set have been opened and closed (NO in step S907), the processing exits this flowchart. In this case, the UI control unit 352 may display a dialog, such as "All of sheet feeding units have been supplied with paper", on the display apparatus 113.

According to the present embodiment, the processing illustrated in FIG. 10 is performed by the information processing apparatus 102. The printing apparatus 103 may include the paper management application and perform the processing of the flowchart illustrated in FIG. 10. In this case, the screens of the paper management application illustrated in FIGS. 4A, 4B, 8, 9A and 9B are displayed on the operation panel 215 provided on the printing apparatus 103.

The information processing apparatus 102 may be set not to perform the highlight display at the time of paper information setting. When the user supplies paper in a sheet feeding unit before setting the paper information using the paper management application, the sheet feeding units having been supplied with paper can be prevented from being highlighted, by setting the highlight display at the time of paper information setting to OFF. When the printing apparatus 103 is not provided with so many feed decks and the highlight display at the time of paper information setting is not necessary, it is unlikely that the user does not recognize sheet feeding units for which the paper information has been set. Therefore, in this case, the user sets the highlight display of the sheet feeding units to OFF. With this setting, a sheet feeding unit can be prevented from being highlighted at a timing when the sheet feeding unit is not intended to be highlighted by the user. In addition, the user may determine whether a sheet feeding unit is to be highlighted, at the time of paper information setting for each sheet feeding unit. When it is unlikely that the user does not recognize sheet feeding units for which the paper information has been set, for example, at the time of paper information setting for a sheet feeding unit dedicated for long paper, the user sets the highlight display of the sheet feeding unit to OFF. With this setting, a sheet feeding unit not ended to be highlighted by the user can be prevented from being highlighted.

With the above-described procedure according to the present embodiment, the paper management application allows highlighting the sheet feeding unit until the sheet feeding unit for which the paper information has been set is supplied with paper. This setting allows the user to immediately check which sheet feeding units have been assigned the paper information until each sheet feeding unit is supplied with paper.

The present disclosure may be formed in such a manner that a feed deck having been neither opened nor closed is highlighted after setting the paper information on the display provided on the operation unit 105 of the printing apparatus 103.

When storing paper in a plurality of sheet feeding units, the user may set paper information on paper to be stored in each sheet feeding unit (before storing paper) and then actually store paper in each sheet feeding unit. According to the present embodiment, the user can immediately know which sheet feeding units among the sheet feeding units which has already been set in association with the paper information have not yet been supplied with paper. Therefore, according to the present embodiment, it becomes unnecessary for the user to check whether paper corresponding to set paper information has been stored in each sheet feeding unit for which the paper information has already been set.

More specifically, according to the present embodiment, it becomes easier for the user to check which sheet feeding units have been supplied with paper after setting paper information in association with each sheet feeding unit.

Other Embodiments

Embodiment(s) of the present disclosure can also be realized by a computer of a system or apparatus that reads out and executes computer executable instructions (e.g., one or more programs) recorded on a storage medium (which may also be referred to more tally as a 'non-transitory computer-readable storage medium') to perform functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-015725, filed Jan. 31, 2018, which is hereby incorporated by reference herein in its entirety.

What is claimed is:

1. An image forming system comprising:
a printing apparatus including a plurality of feeders configured to be pulled out, store sheets, and supply sheets, and an image forming unit configured to form an image on a sheet fed from a feeder of the plurality of feeders;
an information processing apparatus configured to communicate with the printing apparatus;
a reception unit configured to receive a user instruction for setting sheet information about a sheet in association with the feeder;
a display unit configured to display a screen that includes information about the plurality of feeders, wherein, on the screen, information about the feeder in association with which the user instruction for setting has been received is displayed in a display form, as a first display form, different from display forms of information about plural feeders in association with which the user instruction for setting has not been received; and
a detection unit configured to detect that the feeder in association with which the user instruction for setting has been received is closed from a pulled-out state,
wherein, in a case where it is detected by the detection unit that the feeder in association with which the user instruction for setting has been received is closed, the display unit ends display in the display form, and
wherein, based on the sheet information set in association with the feeder, the image forming unit forms an image on a sheet fed from the feeder.

2. The image forming system according to claim 1,
wherein the display unit displays the information about the feeder in a second display form, and
wherein, according to the user instruction, the display unit changes the display form of the information about the feeder from the second display form to the first display form.

3. The image forming system according to claim 1, wherein, in a case where first sheet information has been set in association with the feeder, a user instruction, for setting sheet information about a sheet in association with the feeder, includes an instruction to set, in association with the feeder, second sheet information that is different from the first sheet information.

4. The image forming system according to claim 3, wherein, in a case where the feeder has not been associated with the first sheet information, a user instruction, for setting sheet information about a sheet in association with the feeder, includes an instruction to set paper information in association with the feeder that has not been associated with the first sheet information.

5. The image forming system according to claim 4, wherein, in a case where first sheet information has been associated with the feeder, a user instruction, for setting sheet information about a sheet in association with the feeder, includes an instruction to set sheet information in association with the feeder that is the same as the first sheet information that has been associated with the feeder.

6. The image forming apparatus according to claim 1,
wherein the detection unit is a first detection unit, the image forming apparatus further comprising a second detection unit configured to detect that the closed feeder is pulled out, and
wherein, in a case where a pulled-out state of the feeder has been detected by the second detection unit, the display unit displays the pulled out feeder in a way distinguishable from other feeders not detected as being in a pulled-out state.

7. The image forming system according to claim 1, wherein, according to the user instruction, the display unit displays the sheet information in a second area different from a first area where the information about the feeder is displayed.

8. The image forming system according to claim 7,
wherein the reception unit is configured to receive a selection of the second area, and
wherein, based on the selection of the second area received by the reception unit, the display unit changes the display form of the information about the feeder associated with the sheet information displayed in the second area, from a second display form to the first display form.

9. The image forming system according to claim 1, wherein the sheet information includes at least one of the following: a sheet size, a grammage, and a surface nature.

10. The image forming system according to claim 1, further comprising an acquisition unit configured to acquire a configuration of the feeder provided in the printing apparatus,
wherein the display unit displays a screen for indicating a configuration of the printing apparatus acquired by the acquisition unit, and
wherein, for each of the plurality of feeders provided in the printing apparatus, the screen displays information about the feeder.

11. The image forming system according to claim 1, wherein the user can set whether to change the display form of the feeder subjected to the user instruction from a second display form to the first display form.

12. The image forming system according to claim 1, wherein the first display form displays the information about the feeder in a color different from a color of a second display form.

13. The image forming system according to claim 1, wherein the information about the feeder displayed in a second display form is maintained as displayed in the second display form at least until the user instruction is issued.

14. A printing apparatus comprising:
a plurality of feeders configured to be pulled out, store sheets, and supply sheets;
an image forming unit configured to form an image on a sheet fed from a feeder of the plurality of feeders;
a reception unit configured to receive a user instruction for setting sheet information about a sheet in association with the feeder;
a display unit configured to display a screen that includes information about the plurality of feeders, wherein, on the screen, information about the feeder in association with which the user instruction for setting has been received is displayed in a display form, as a first display form, different from display forms of information about plural feeders in association with which the user instruction for setting has not been received; and
a detection unit configured to detect that the feeder in association with which the user instruction for setting has been received is closed from a pulled-out state,
wherein, in a case where it is detected by the detection unit that the feeder in association with which the user instruction for setting has been received is closed, the display unit ends display in the display form, and
wherein, based on the sheet information set in association with the feeder, the image forming unit forms an image on a sheet fed from the feeder.

15. The printing apparatus according to claim 14, wherein, in a case where the display unit displays the information about the feeder in a second display form, the display unit changes the display form of the information about the feeder from the second display form to the first display form according to the user instruction.

16. An information processing apparatus capable of communicating with a printing apparatus, wherein the printing apparatus includes a plurality of feeders configured to be pulled out, store sheets, and supply sheets and a detection unit configured to detect that a feeder of the plurality of feeders is closed from a pulled-out state, the information processing apparatus comprising:
an acquisition unit configured to acquire information about the feeder from the printing apparatus;
a display unit configured to display the information about the feeder acquired by the acquisition unit; and
a reception unit configured to receive a user instruction for associating sheet information with an associated feeder, and to receive a signal transmitted from the printing apparatus based on a detection by the detection unit,
wherein the display unit displays the information about the associated feeder in a first display form and, based on the signal received by the reception unit, changes the display by the display unit including the first display form including the information about the associated feeder to a display including a second display form.

17. A method for controlling an image forming system having a printing apparatus including a plurality of feeders configured to be pulled out, store sheets, and supply sheets, and an image forming unit configured to form an image on a sheet fed from a feeder of the plurality of feeders, the method comprising:
communicating with the printing apparatus;
receiving a user instruction for setting sheet information about a sheet in association with the feeder;
displaying a screen that includes information about the plurality of feeders, wherein, on the screen, information about the feeder in association with which the user instruction for setting has been received is displayed in a display form different from display forms of information about plural feeders in association with which the user instruction for setting has not been received;
detecting that the feeder in association with which the user instruction for setting has been received is closed from a pulled-out state, wherein, in a case where it is detected that the feeder in association with which the user instruction for setting has been received is closed, displaying includes ending display in the display form; and
forming, by the image forming unit and based on the sheet information set in association with the feeder, an image on a sheet fed from the feeder.

18. A non-transitory computer-readable storage medium storing a program to cause a computer to perform a method for controlling an image forming system having a printing apparatus including a plurality of feeders configured to be pulled out, store sheets, and supply sheets, and an image forming unit configured to form an image on a sheet fed from a feeder of the plurality of feeders, the method comprising:
communicating with the printing apparatus;
receiving a user instruction for setting sheet information about a sheet in association with the feeder;
displaying a screen that includes information about the plurality of feeders, wherein, on the screen, information about the feeder in association with which the user instruction for setting has been received is displayed in a display form different from display forms of information about plural feeders in association with which the user instruction for setting has not been received;

detecting that the feeder in association with which the user instruction for setting has been received is closed from a pulled-out state, wherein, in a case where it is detected that the feeder in association with which the user instruction for setting has been received is closed, displaying includes ending display in the display form; and forming, by the image forming unit and based on the sheet information set in association with the feeder, an image on a sheet fed from the feeder.

\* \* \* \* \*